(12) United States Patent
Lang

(10) Patent No.: US 10,525,830 B2
(45) Date of Patent: Jan. 7, 2020

(54) CURRENT COLLECTING DEVICE AND CONDUCTOR LINE SYSTEM

(71) Applicant: CONDUCTIX-WAMPFLER GMBH, Weil am Rhein (DE)

(72) Inventor: Dietmar Lang, Schliengen (DE)

(73) Assignee: CONDUCTIX-WAMPFLER GMBH, Weil am Rhein (DE)

(*) Notice: Subject to any disclaimer, the term of this patent is extended or adjusted under 35 U.S.C. 154(b) by 465 days.

(21) Appl. No.: 15/307,840

(22) PCT Filed: Oct. 23, 2015

(86) PCT No.: PCT/EP2015/074567
§ 371 (c)(1),
(2) Date: Oct. 31, 2016

(87) PCT Pub. No.: WO2016/128076
PCT Pub. Date: Aug. 18, 2016

(65) Prior Publication Data
US 2017/0057359 A1    Mar. 2, 2017

(30) Foreign Application Priority Data
Feb. 10, 2015  (DE) .................. 10 2015 101 849

(51) Int. Cl.
*B60L 5/08* (2006.01)
*B60L 5/40* (2006.01)
*B60L 5/16* (2006.01)

(52) U.S. Cl.
CPC .................. *B60L 5/08* (2013.01); *B60L 5/16* (2013.01); *B60L 5/40* (2013.01)

(58) Field of Classification Search
CPC ...... B60L 5/08; B60L 5/16; B60L 5/19; B60L 5/20; B60L 5/38; B60L 5/40
(Continued)

(56) References Cited

U.S. PATENT DOCUMENTS 1,826,854 A   10/1931  Wilmot
3,396,246 A    8/1968  Roney
(Continued)

FOREIGN PATENT DOCUMENTS

DE    3018428    11/1981
DE    3610455    10/1987
(Continued)

OTHER PUBLICATIONS

International Preliminary Report on Patentability dated Aug. 15, 2017 for PCT/EP2015/074567, filed Oct. 23, 2015.
(Continued)

*Primary Examiner* — Zachary L Kuhfuss
(74) *Attorney, Agent, or Firm* — Paul D. Bianco; Gary S. Winer; Fleit Intellectual Property Law

(57) ABSTRACT

A current collecting device for an electrical load that can travel in a direction of travel along a conductor line, with at least two sliding contact pieces arranged on a rocker one after another in the direction of travel. The rocker is mounted on a rocker arm about a rotation axis extending perpendicularly to the travel direction, through which rocker arm the rocker can be moved towards a conductor for contact of the sliding contact pieces with an electrically conductive conductor strand of the conductor line. A conductor line system includes such a conductor line and at least one such electrical load. The current collecting device and conductor line system provide a reliable guiding of the current collecting device contact in the conductor strand of the conductor line, as well as reliable energy transmission.

21 Claims, 7 Drawing Sheets

(58) Field of Classification Search
USPC .................................................. 191/58, 59.1
See application file for complete search history.

(56) References Cited

U.S. PATENT DOCUMENTS

| | | | |
|---|---|---|---|
| 4,428,466 A | | 1/1984 | Mayer |
| 4,464,546 A | * | 8/1984 | Culver ...................... B60L 5/08 |
| | | | 191/49 |
| 4,742,185 A | | 5/1988 | Pelletier et al. |
| 5,180,041 A | * | 1/1993 | Shuto ........................ B60L 5/38 |
| | | | 191/53 |
| 5,203,437 A | | 4/1993 | Bormann |
| 5,732,803 A | * | 3/1998 | Breitbach .................. B60L 5/30 |
| | | | 191/55 |
| 5,735,374 A | | 4/1998 | Breitbach et al. |
| 6,152,273 A | * | 11/2000 | Kilkenny .................. B60L 5/08 |
| | | | 191/58 |
| 2014/0110205 A1 | * | 4/2014 | Dronnik ..................... B60L 5/08 |
| | | | 191/59.1 |
| 2017/0057359 A1 | * | 3/2017 | Lang ......................... B60L 5/08 |
| 2017/0349049 A1 | * | 12/2017 | Lang ......................... B60L 5/08 |

FOREIGN PATENT DOCUMENTS

| | | |
|---|---|---|
| DE | 19540914 | 5/1997 |
| EP | 0226497 | 6/1987 |
| EP | 0453721 | 10/1991 |
| EP | 1352777 | 10/2003 |
| FR | 2320204 | 3/1977 |
| JP | S63202202 | 8/1988 |

OTHER PUBLICATIONS

International Search Report with Written Opinion dated Jan. 20, 2016 for PCT/EP2015/074567, filed Oct. 23, 2015.
Result of examination report for German Application No. 10 2015 101 849.7, filed Feb. 10, 2015.

* cited by examiner

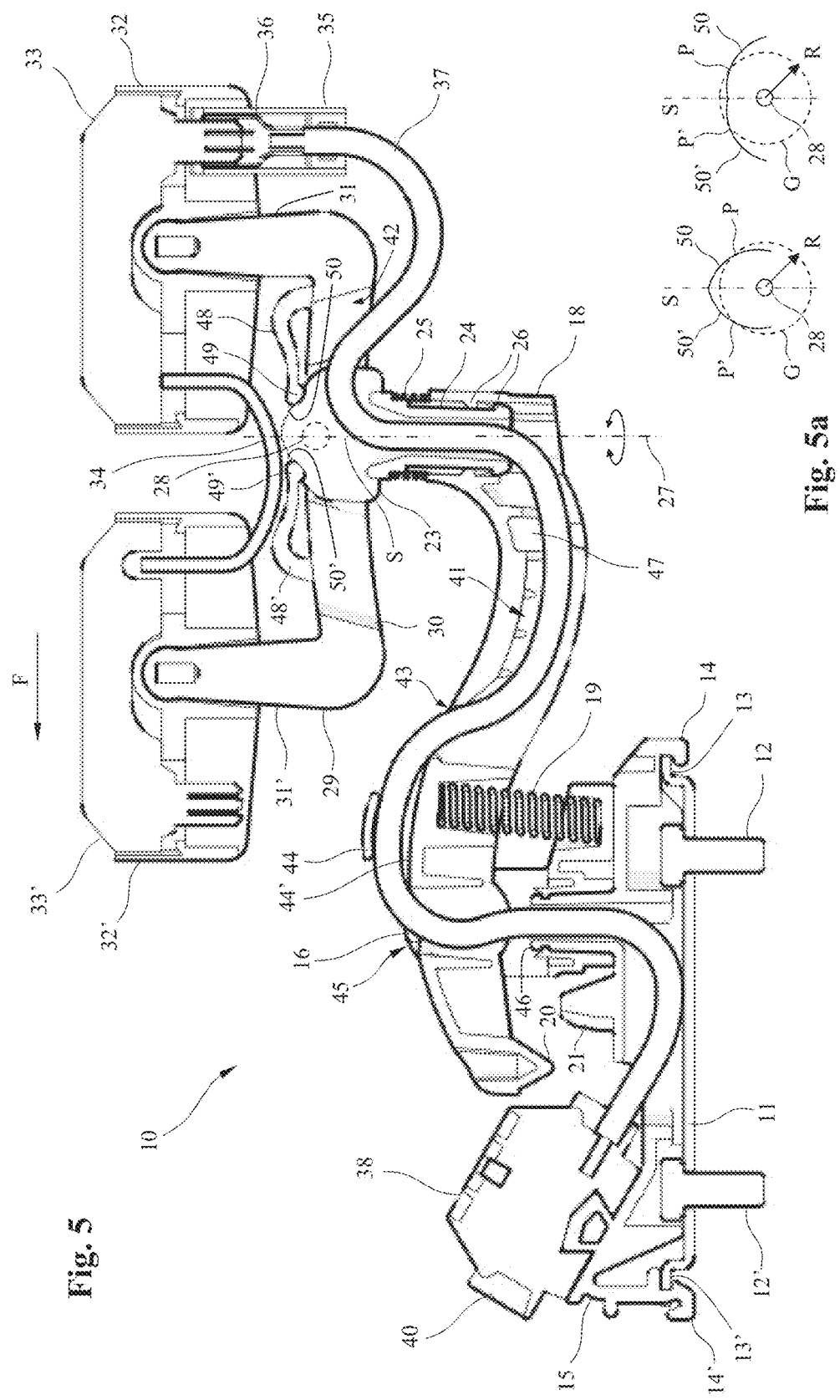

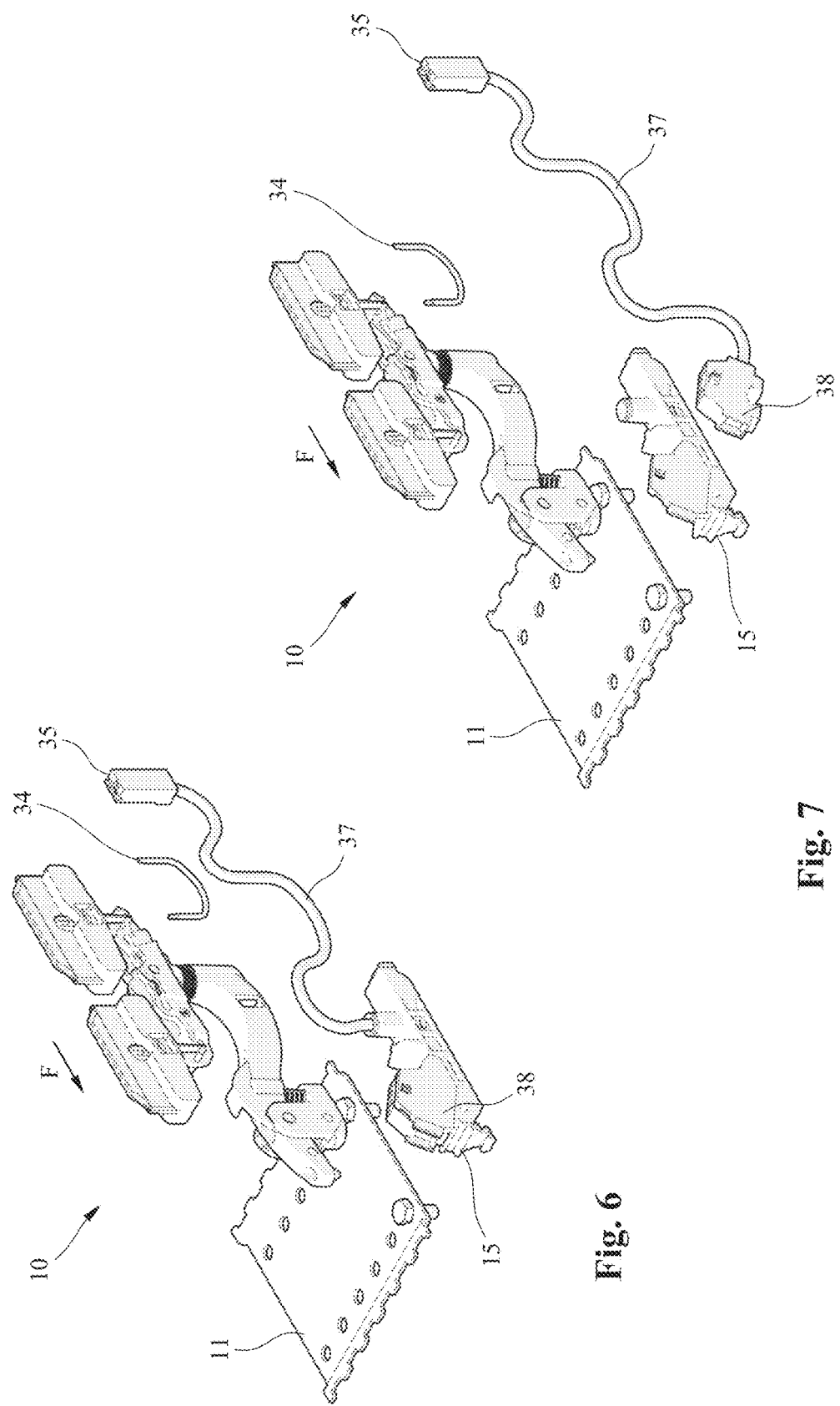

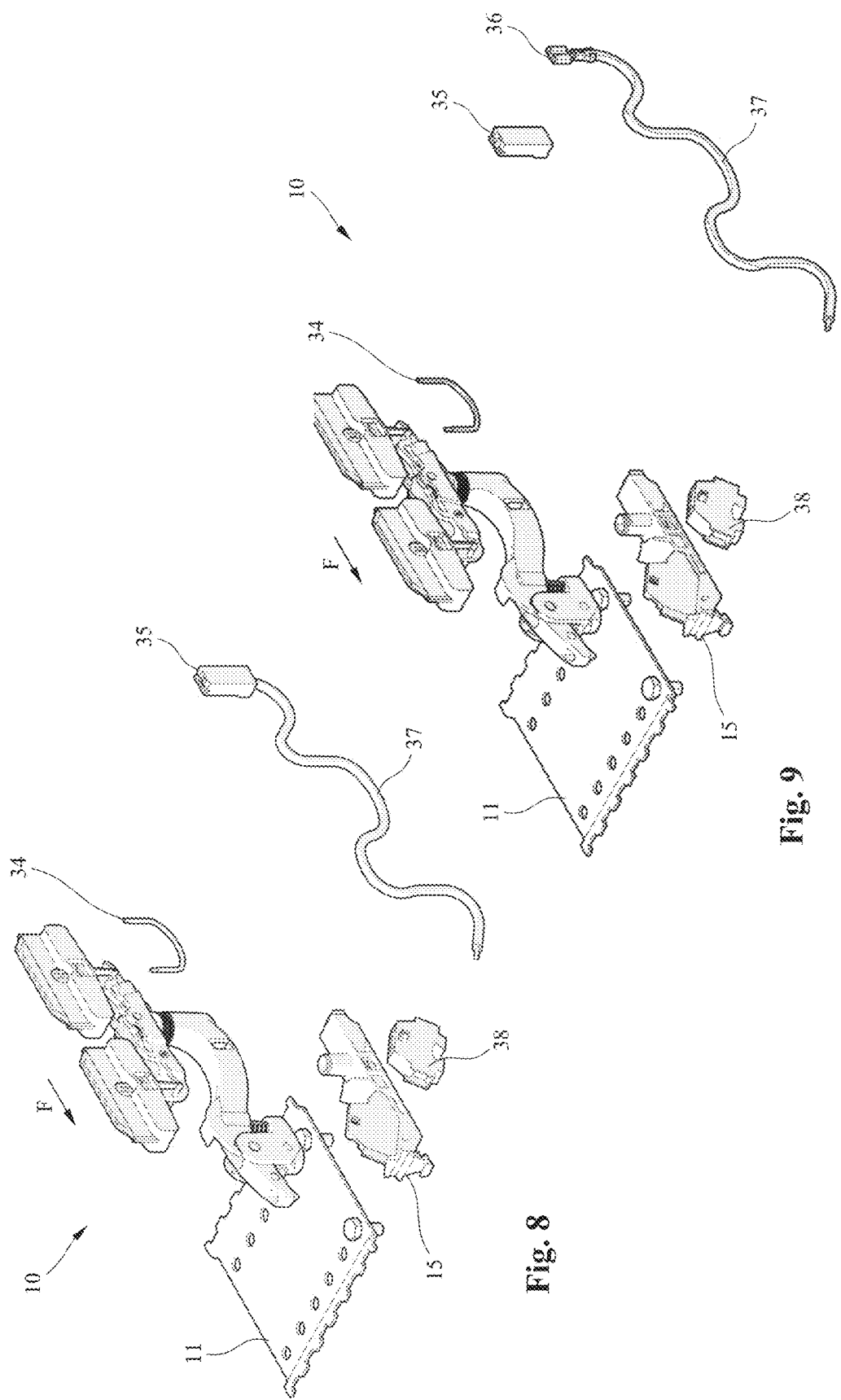

CURRENT COLLECTING DEVICE AND CONDUCTOR LINE SYSTEM

FIELD OF THE INVENTION

The invention relates to a current collecting device for a conductor line as well as to a conductor line system.

BACKGROUND

In known conductor line systems, a movable electrical load travels along a conductor line. The supply of the load with electrical energy here occurs via a current collecting device whose sliding contacts engage conductor strands of the conductor line. The load can be, for example, a transport box of an overhead track conveyor, a cable trolley that can travel on rails, or also so-called E-RTG container cranes that are equipped with an electrical drive that is supplied with electrical energy by the conductor line.

U.S. Pat. No. 3,396,246 A discloses a current collecting device for an electrical load that can travel along a contact wire, with two sliding contact pieces arranged after one another, each on its own lever arm. The two arms are arranged in each case on a fork bearing in such a manner that they can rotate about a common rotation axis, and they are pulled closed, towards one another, by two coil springs. The ends of the coil springs here are led in each case through openings in the arms. The separate arrangement of the two arms is expensive and requires the installation of two respective coil springs.

U.S. Pat. No. 1,826,854 A discloses a current collecting device for electrical loads that can move along a contact wire, which can tap current from the contact wire by means of two running rollers arranged consecutively. Here, the current collecting rollers are connected to sliding contacts of a conductor ring arrangement via short supply lines. The contact surfaces of the sliding contact ring arrangement, which are stationary relative to the sliding contacts, are arranged on an arm, which itself is arranged above a base. Supply lines extend from the stationary contact surfaces of the sliding contact ring arrangement to a second sliding contact ring arrangement arranged on the base. This construction is expensive due to the two sliding contact ring arrangements, and, at least in the area of the first sliding contact ring arrangement, which is not shielded relative to the exterior, it is contact-endangered.

EP 0 226 497 B1 discloses a current collecting head for a trolley bus, in which the lines are led between a sliding contact that can be rotated through a large angle and a connection clamp, in part in a rotating arm of the current collecting device and in part exposed in open areas. In the open areas, the lines risk being damaged from the outside or being caught. Moreover, the lines are not led in a defined manner or fastened between a sliding contact and a connection clamp, so that they impede the movements of the arm and of the sliding contact due to their current position. In addition, the lines are continually moved back and forth as a result, so that the electrically conductive line cores can be damaged and the insulations can be abraded. Thus, there is also a risk of injury to persons, if the line cores are exposed in places.

In addition, the movement of the sliding contact is limited only by two end abutments. At best, an automatic resetting into a preferred resting position with good contact on the conductor strand of the conductor line is provided by the lines that are led haphazardly through the current collecting head.

DE 30 18 428 A1 discloses a control current transferring device with a contact sensor arrangement for trolleys in conveyor systems, which is in springy contact with the control current rail. There too, the control current lines are only partially protected and largely led freely movably through an elongate housing. Here too, there is the risk that the control current lines or their insulation could be damaged due to continual movements of the control current transferring device and the contact sensor arrangement.

In JP S63-202202 A, in the case of a current collecting device for conductor lines, the connection line to the sliding contact pieces is also largely free and attached only at one site of the current collecting device to a clip made of a metal plate. Here, it is precisely in the area of the clip that there is a risk of the sharp metal plate damaging the insulation of the line. Otherwise the risk also exists of the line being caught or migrating.

In EP 1 352 777 A1 as well, in a current collecting device for conductor lines, the exposed line extends away from the sliding contact, so that here, too, there is an increased risk of damage.

DE 36 10 455 A1 discloses a current collecting head with two sliding contact pieces arranged on a rocker mounted in manner so it can rotate. A tilting area of the rocker is limited by abutments on the bearing of the rocker. However, between the abutments, the rocker can be moved freely back and forth, so that no optimal contact on the conductor strand of the conductor line is ensured. There, the connecting line also extends largely exposed and unprotected away from the sliding contact pieces.

SUMMARY OF THE INVENTION

One embodiment of the invention disclosed is a current collecting device and a conductor line system which overcome the above-mentioned disadvantages and enable a reliable guiding of the current collecting device contact in the conductor strand of the conductor line, as well as a reliable energy transmission.

Advantageous developments and embodiments of the invention are also disclosed.

The current collecting device a first spring arm is arranged on a rocker, which slides on a first sliding surface associated with the rocker arm, or the first spring arm is associated with the rocker arm and the first sliding surface is arranged on the rocker, wherein, in the case of deflection of the rocker from a resting position, the first rocker arm is untensioned and pushes the rocker back towards the resting position. As a result, it is possible to ensure that the two sliding contact pieces of the rocker are always pushed optimally and evenly against the conductor strand. A raising of the sliding contact pieces, which leads to poor energy transmission and, possibly, also to undesired flash over between the conductor strand and the sliding contact pieces can, thus, be largely prevented. In addition, an even wear of the sliding contact pieces can also be achieved, so that the maintenance intervals for replacing the sliding contact pieces can be increased and the resulting installation idle times can be reduced.

In an advantageous embodiment, on the rocker, a second spring arm can be arranged, which slides on a second sliding surface associated with the rocker arm, in the case of deflection of the rocker from the resting position, the first spring arm is tensioned in a direction of rotation about the rotation axis, and the rocker pushes against the direction of rotation towards the resting position, and, in the case of deflection of the rocker from the resting position, the second spring arm is tensioned in the other direction of rotation, and the rocker pushes against the other direction of rotation towards the resting position. Alternatively, the second spring arm can also be associated with the rocker arm, and the second sliding surface can be arranged on the rocker, that is to say the arrangement of spring arm and sliding surface can be switched.

Preferably, the spring arms arranged on the rocker can here be arranged on sides of the rotation axis that face one another in the direction of travel and are oriented towards one another. The spring arms, thus, point in the direction of the rotation axis or of a symmetry axis extending through said rotation axis. Accordingly, in an alternative embodiment, the spring arms arranged on the rocker arm can point away from the rotation axis in opposite directions. Moreover, in an advantageous development, the spring arms and/or the sliding surface can be formed so that they extend symmetrically relative to a symmetry axis extending perpendicularly on the direction of travel and extending through the rotation axis.

Preferably, the spring arm(s) can slide with their free end on the sliding surface(s). Here, the spring arm(s) can have thickened sliding contacts on their free ends in order to improve the sliding capacity.

In a design having an advantageous construction, the spring arms and/or the sliding surfaces can be arranged on a bearing block of the rocker arm, which is preferably arranged on a rocker arm in such a manner that it can rotate about an additional rotational axis extending perpendicularly of the rotational axis of the rocker and the direction of travel. Here, the bearing block advantageously can have a hollow, preferably a hollow cylindrical, connection piece, which is inserted into a corresponding hollow, preferably hollow cylindrical, opening of the rocker arm.

In order to hold the bearing block on the rocker arm, a clip-on and/or snap connection can be provided between a connection piece and an opening of the rocker arm.

Preferably, the rocker arm can be arranged in such a manner that it can rotate on a base about an additional rotation axis extending perpendicularly to the direction of travel and parallel to the rotation axis of the rocker, wherein, advantageously, the rocker arm can be pushed by a spring away from the base and towards the conductor strand. In this manner, the rocker and the sliding contact pieces can be reliably pushed onto the conductor strand. In addition, the rocker arm can also be positioned about an additional rotational axis perpendicular to the direction of travel and perpendicular to the rotation axis of the rocker, that is to say perpendicular on a plane defined by the guide strands. As a result, the rocker can compensate for sideways deviations from the direction of travel.

In an embodiment that is advantageous from the viewpoint of installation, the base can be clipped to a support plate by means of one or more snap connections. As a result, a rapid and simple exchange of the current collecting device can occur, for example, in the case of a defect of the current collecting device, or of worn sliding contact pieces. Advantageously, a connection clamp for the end of a connection line, which is at a distance from the sliding contact piece, for the sliding contact pieces can be detachably connected to the base, preferably by means of a plug connection of a dovetail-like design between a connection clamp and a base.

Advantageously, the base as well as the rocker arm, the bearing block, the hollow cylindrical connection piece and/or the rocker can also be made of plastic, in particular a hard plastic such as duroplastics, for example. Preferably, the spring arms can be produced from the same material as the rocker or the bearing block, and, particularly advantageously, they can be produced so that they form one piece with the rocker or the bearing block.

Here, the spring arm(s) can be provided on a connection arm of the rocker, in particular on facing sides of the rocker, relative to the rotation axis extending to the direction of travel.

Preferably, at least the first sliding surface can be designed so that the first spring arm is more strongly tensioned during the movement out of the resting position than in the resting position. Here, in the resting position, the first spring arm can be in contact with the sliding surface, wherein an area of the sliding surface adjacent thereto can be formed so that, during the movement out of the resting position, the first spring arm can be more strongly tensioned in a direction than in the resting position. Advantageously, an additional area of the sliding surface, which is adjacent to the area of the sliding surface, and which is located in reference to the site where the sliding surface is in contact with the first spring arm on the opposite side like the area of the sliding surface, can here be formed so that the first spring arm is more strongly tensioned in the opposite direction during the movement out of the resting position than in the resting position. As a result, during the movement of the rocker in the two directions, even using only a single spring arm, a resetting of the rocker into the resting position can be achieved. Alternatively, the additional area adjacent to the area of the sliding surface can be formed so that the first spring arm is weaker in the opposite direction during the movement out of the resting position than in the resting position.

By means of a conductor line system provided with such a current collecting device, these advantages can be used satisfactorily. In the process, advantageously, the movable electrical loads can comprise multiple current collecting devices arranged next to one another for contacting correspondingly adjacently arranged conductor strands of the conductor line.

BRIEF DESCRIPTION OF THE DRAWINGS

The invention is described below using detailed embodiment examples in reference to the accompanying drawings. In the drawings:

FIG. 5 shows a lateral cross-sectional view on the current collecting device according to FIG. 3;

FIG. 5a shows detail views of the resetting mechanism of FIG. 5;

FIGS. 6-9 show exploded representations of the current collecting device of FIG. 3.

DETAILED DESCRIPTION OF THE INVENTION

Figure 1:
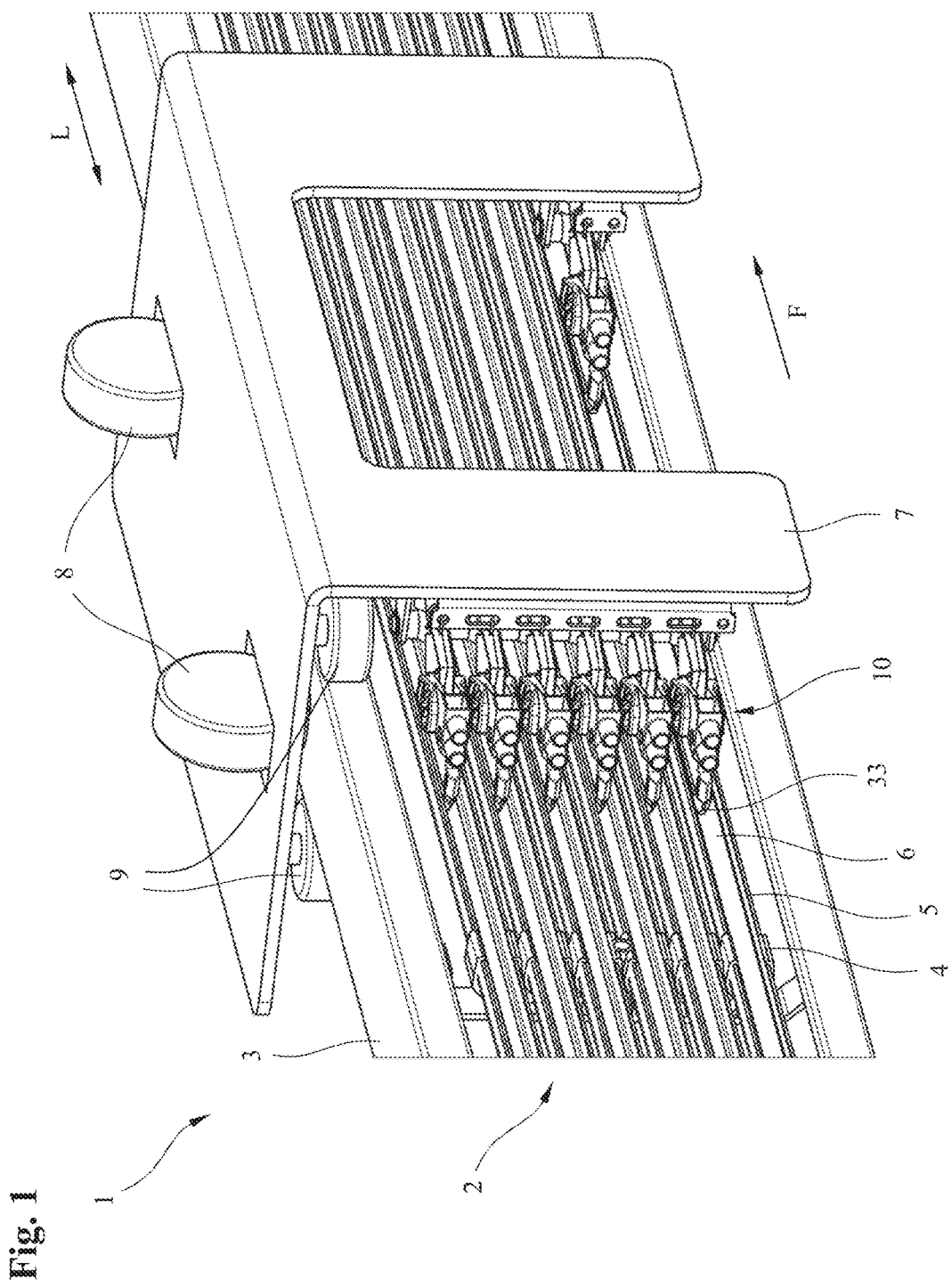
FIG. 1 shows a diagrammatic, three-dimensional view of a section of a conductor line system according to the invention.

The conductor line system 1 partially represented in FIG. 1, comprises an elongate conductor line 2 and a rail strand 3 having a double-T shape in cross section. On the rail strand 3, a conductor strand holder 4 is arranged. Additional conductor strand holders arranged along the rail strand 3 are not represented in the drawing.

In total, the conductor strand holder 4 comprises six elongate profiled insulation sections extending along the conductor line 2 in a longitudinal direction L and described below using insulation profile 5. The indications on this also correspondingly apply to the additional profiled insulation sections.

An electrically conductive conductor strand 6, which is substantially C- or U-shaped in cross section, is inserted into the substantially U-shaped electrically non-conductive profiled insulation section 5. The open side of the U-shaped cross section of insulation profiled section 5 and conductor strand 6 face the observer in FIG. 1. Usually, one of the conductor strands inserted in the profiled insulation sections is a ground and/or protection conductor. The other conductor strands are current- or voltage-conducting phase conductor strands and used for supplying electrical energy to movable electrical loads indicated by a transport box 7.

The movable transport box 7, which points in a direction of travel F extending in longitudinal direction L, has an electrical drive motor, not represented in FIG. 1, for drive wheels 8. The drive wheels 8 run on the horizontal upper T-shaped area of the rail strand 3. On the side, the transport box 7 is led through side guide wheels 9.

In order to supply the electrical load to the drive motor of the transport box 7, for example, and also in order to connect the electrical loads to the ground and/or protection conductor strand, at least one current connecting device is provided for each conductor strand, which is explained by way of an example using a current collecting device 10 represented in detail in FIGS. 2 to 9. Corresponding indications also apply to the other current collecting devices.

Figure 2:
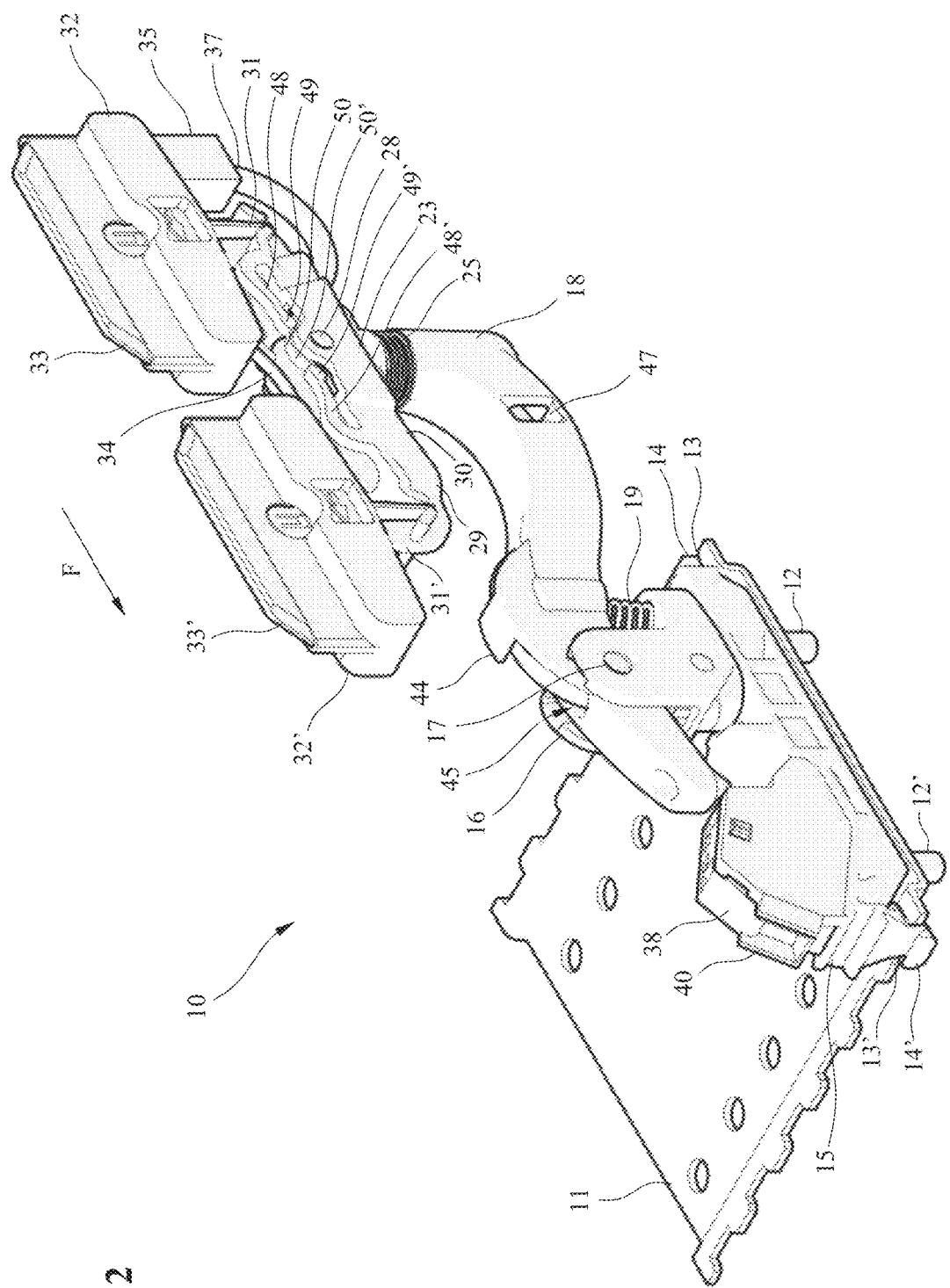
FIG. 2 shows a diagrammatic, three-dimensional view of a current collecting device of the conductor line system of FIG. 1.
Figure 3:
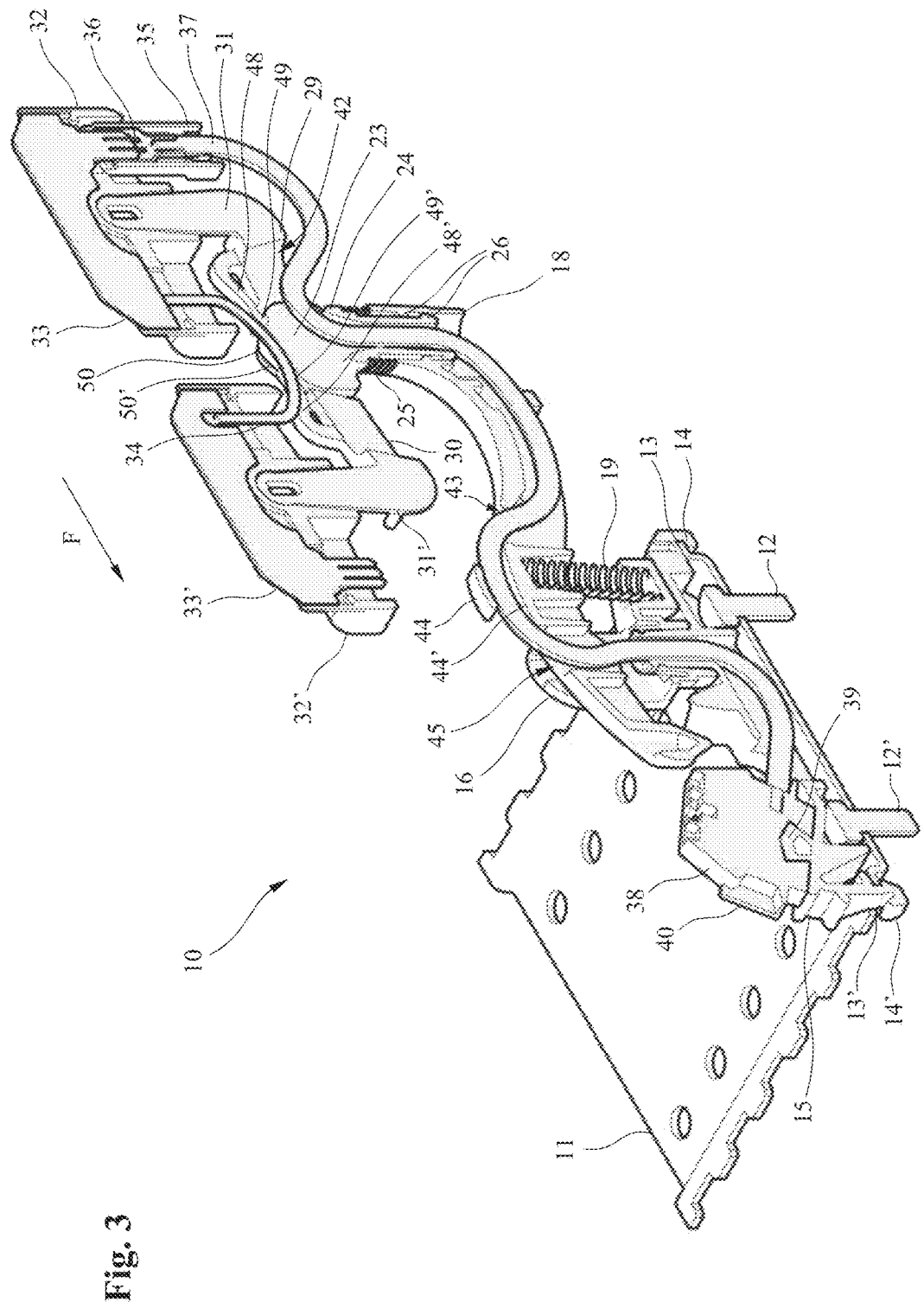
FIG. 3 shows a cross-sectional view through the current collecting devices of FIG. 2.
Figure 4:
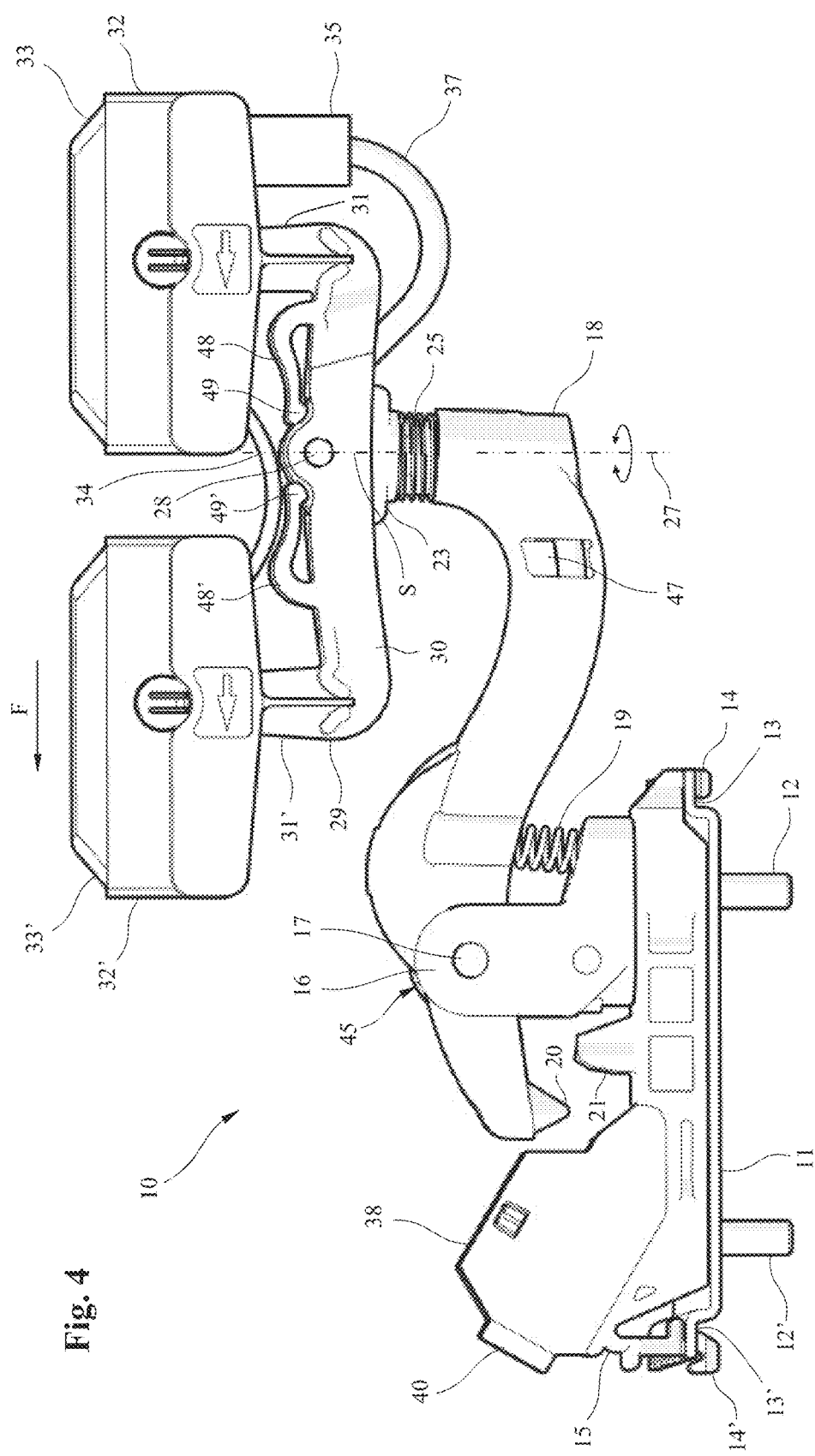
FIG. 4 shows a lateral top view on the current collecting device according to FIG. 2.

In order to attach the current collecting device 10 to the transport box 7, a support plate 11 is provided. This support plate is firmly fastened by means of connection screws 12, 12' to the inner side of the arm of the transport box 7, which projects downwardly. On opposite facing side edges of the support plate 11, multiple setbacks 13, 13' are arranged so that they are aligned with one another in pairs. Snap connections 14, 14' of a base 15 of the current collecting device are clipped into these setbacks 13, 13'. As can be seen in FIGS. 2 and 3, six pairs of setbacks 13, 13' are provided in the present case, in order to be able to attach six current collecting devices of FIG. 1.

On the base 15, a fork-shaped bearing 16 is provided, which is rotatable about a rotation axis that extends perpendicularly on the support plate 11, and on which a rocker arm 18 is arranged in such a manner that it can rotate about a first rotation axis 17. The rocker arm 18 is pushed away from the base 15 via a coil spring 19 shown in a pretensioned state in FIGS. 2 to 5, and, thus, pushes in the direction of the conductor strand 6. Here, the coil spring 19 is arranged on an elongated base of the bearing 16 and, thus, is capable of rotating with the bearing 16 about the rotation axis extending perpendicularly on the support plate 11. Instead of a coil spring, other suitable elements can also be used, which push the rocker arm 18 away from the base 15 and towards the conductor strand 6.

In order to prevent the rocker arm 18 from moving too far in the direction of the conductor strand 6, a centering pin 20 is provided on the shorter end, the left end in FIGS. 2 to 5, which centering pin abuts against a centering abutment 21 arranged on the base 15. This centering abutment becomes active particularly if the transport box 11 with the current collecting device 10 is taken off the conductor line 2 and then inserted again. Preferably, for this purpose, the centering pin 20 can be formed in the shape of a wedge or cone and engage the abutment 21 formed in a correspondingly inner wedge- or cone-shape. As a result, the rocker arm 18 can be moved advantageously into a position extending parallel to the direction of travel F and to the longitudinal direction L of the conductor line 2, in order to be able to introduce the current collecting device 10 cleanly into the conductor strand 6.

On the longer end, in FIGS. 2 to 5 the right end, a hollow cylindrical connection piece 24 of bearing block 23 is inserted into opening 22 of the rocker arm 18. The bearing block 23 is pushed via an additional coil spring 25 towards the conductor strands 6 and prevented from falling out of the opening 22 by means of a click-on connection 26. As a result, the bearing block 23 can yield slightly in direction of the conductor strand 6, as a result of which irregularities in the conductor strand 6 can be compensated.

On the bearing block 23, a rocker 29, which is essentially U-shaped when viewed from the side, with a connection arm 30 arranged in such a manner that it can rotate about a second rotational axis 27, to the end of which connection arm support arms 31, 31' each with a sliding contact piece holder 32, 32' are arranged. The piece holders 32, 32' each support a sliding contact piece 33, 33', which are provided for the frictional contacting of the conductor strand 6. The rocker 29 has longitudinal recesses or depressions, at least in the area between the support arms 31, 31' and the bearing block 23.

The base 15 and also the rocker arm 18, the bearing block 23 with the hollow cylindrical connection piece 24 and the rocker 29 are here produced from plastic, in particular from a hard plastic such as duroplastics, for example.

In order to introduce the sliding contact pieces 33, 33' into the U-shaped conductor strand 6 and have them travel along said conductor strand in direction of travel F, the rocker 29 and the rocker arm 18 can be moved substantially in a travel plane extending through the conductor strand 6, except for lateral movements that, per se, are undesirable and that can be caused by an inaccurate course of the conductor strand, of the conductor line, and of the travel movement of the load. The travel plane here extends substantially perpendicularly on a plane through the multiple conductor strands.

In order to convey the electrical current from the conductor strand 6 to the electrical loads on the transport hook 7, the two sliding contact pieces 33, 33' are connected to one another in an electrically conductive manner via a connection cable 34. Moreover, a socket 35 for a plug 36 is provided on the sliding contact piece holder 31, on the right in FIGS. 2 to 5. The plug 36 is attached at one end of a connection cable 37. The connection cable 37 is firmly connected at the other insulated end to a connection clamp 38. The connection clamp 38 is here connected to the base 15 via a connection 39 of dovetail-like design. Via an additional connection 40 of the connection clamp 38, a connection line to one or multiple electrical loads of the transport box 7 can then be established.

The connection cable 37 is here led in a defined manner on a path from the socket 35 to the connection clamp 38, advantageously in a cable guide channel 41. By means of this defined guiding of the cable 37, disadvantageous influences on the movability of the rocker arm 18 or rocker 29 that would otherwise occur can be largely prevented.

First, the cable channel 41 has an aperture 42 in the bottom side of the rocker 29, through which the cable 37 arriving from the socket 35 is introduced between the two side walls of the rocker 29, and then led through the hollow cylindrical connection piece 24 of the bearing block 23.

From there, the cable 37 is then led through the front area of the rocker arm 18, which is preferably open on the bottom side. As a result, the cable 37 can be easily installed, so that the free end can be led through an aperture 43 arranged adjacently to the bearing 16 in the upper wall of the rocker arm 18 and then in a clamping manner between two clamping arms 44, 44'. Subsequently, the cable 37 is introduced downwardly through an additional aperture 45 in the shorter arm of the rocker arm 18 and through a hollow cylindrical cable inlet 46 into the base 15, where it is then led, still in the cable channel 41, to the connection clamp 38.

A viewing window 47 in the longer portion of the rocker arm 18 also makes it possible to conduct a check from the side to determine whether the cable 37 is properly guided.

In order to ensure that the sliding contact pieces 33, 33' are both applied as well as possible and evenly against the conductor strand 6, it can be advantageously ensured that, in the case of deflection from its resting position shown in the drawings, the rocker 29 automatically moves back into this resting position. For this purpose, two symmetrically formed spring arms 48, 48', which point in the direction of the bearing block 23, are provided on the horizontal connection arm of the rocker 29. At their free ends, the spring arms 48, 48' have, thickened sliding contacts 49, 49', which can slide on sliding surfaces 50, 50' of the bearing block 23, which are also formed symmetrically.

Since the spring arms 48, 48' are pretensioned against the sliding surfaces 50, 50', a resetting force is continually exerted as a result, which moves the rocker 29 into the resting position shown in the figures. In the drawings, this is represented in that the sliding contacts 49, 49' presumably penetrate into the sliding surfaces 50, 50'. However, the sliding contacts 49, 49' in fact slide on the sliding surfaces 50, 50' without penetrating into them.

If the rocker 29 is deflected from the resting position, then the resetting force of the spring arm 48, 48' that is moved with the rocker 29 away from the base 15 and towards the conductor strand 6 is increased. The resetting force of the respective other spring arm 48, 48', on the other hand, decreases, so that the rocker 29 is again moved back into the resting position. If the rocker 29 is raised on the right in FIGS. 2 to 5, then the resetting force of the right spring arm 48 increases, while the left spring arm 48' is untensioned. As a result, the rocker 29 is then moved back into the resting position shown in FIGS. 2 to 5.

For this purpose, the sliding surfaces 50, 50' are formed so that, when the rocker 29 is moved out of the resting position, the spring arm 48, 48' that is moved out of its resting position away from the base 15 and towards the conductor strand 6 is more strongly tensioned, while the other spring arm 48, 48' that is moved out of its resting position towards the base 15 and away from the conductor strand 6 is untensioned.

In an advantageous embodiment, for this purpose, the area of the sliding surfaces 50, 50' that extend from the resting position of the sliding contacts 49, 49' to the symmetry axis S through the third rotation axis 28 extend more steeply than an imaginary circle G of radius R of the sliding contacts 49, 49' about the rotation axis 28. In the same way, the other area of the sliding surfaces 50, 50' can extend at a less steep slope. This resetting mechanism is represented, for example, on the left in FIG. 5a.

For example, the sliding surfaces 50, 50' can be formed, as shown in the detail of FIG. 5a, as a segment of circle of radius R that intersects the imaginary circle G of the sliding contacts 49, 49' in the resting position of the sliding contacts 49, 49' on the sliding surfaces 50, 50' at the intersection point P or P'. However, other designs of the sliding surfaces can also be provided that have the same effect, for example, a straight sliding surface that extends through the intersection point P tangentially on the imaginary circle G.

The areas of the sliding surfaces 50, 50' that extend from the resting position of the sliding contacts 49, 49' away from the symmetry axis S, can also have a flatter course than the imaginary circle G of the sliding contacts 49, 49'. As a result, when the rocker 29 is deflected from the resting position, the spring arm 48, 48' that moves away from the conductor strand 6 and towards the base 15 can be more strongly tensioned than in its resting position, so that it pulls the rocker 29 back into the resting position. This resetting mechanism is represented, for example, on the right in FIG. 5a.

If the two variants represented in FIG. 5a are linked to one another, namely in such a manner that, on the left in FIG. 5a, the sliding surfaces located above the intersection points P, P' are used, and, on the right in FIG. 5a, the sliding surfaces located beneath the intersection points P, P', are used, preferably also only one spring arm 48, 48' can be used. Since, if the spring arm 48, 48' is moved out of the intersection point P, P', which in fact corresponds to the compensated resting position of the rocker 29, then the spring arm 48, 48' is always more strongly tensioned than when it is at the intersection point P, P', so that, in this way, it exerts a force on the rocker 29 such that it is moved back into the resting position. In principle, it would then also be possible to use only one spring arm 48 or 48' on one side of the symmetry axis S, and the other spring arm 48' would then no longer be needed. However, for reasons pertaining to reliability and selection safety, it is advantageous to use two facing spring arms 48, 48'.

In principle, the spring arms 48, 48' can also be provided on the main block 23, so that corresponding sliding surfaces are provided on the rocker 29, which, in the case of a deflection of the rocker 29 from the resting position deflection, more strongly tension the spring arm that acts against the deflection.

The additional FIGS. 6 to 9 again show exploded representations of the current collecting device 10 represented in detail in FIGS. 2 to 5.

LIST OF REFERENCE NUMERALS

1 Conductor line system
2 Conductor line
3 Rail strand
4 Conductor strand holder
5 Profiled insulation section
6 Conductor strand
7 Transport box
8 Drive wheels
9 Side guide wheels
10 Current collecting device
11 Support plate
12, 12' Connection screws
13, 13' Setbacks
14, 14' Snap connections
15 Base
16 Fork-shaped bearing
17 First rotation axis of the rocker arm relative to the base
18 Rocker arm
19 Coil spring
20 Centering pin
21 Centering abutment
22 Hollow cylindrical opening
23 Bearing block 24 Hollow cylindrical connection piece
25 Coil spring
26 Snap connection
27 Second rotation axis of the bearing block relative to the rocker arm
28 Third rotation axis of the rocker relative to the bearing block
29 Rocker
30 Connection arm
31, 31' Support arm
32, 32' Sliding contact piece holder
33, 33' Sliding contact piece
34 Connection cable
35 Socket
36 Plug
37 Connection cable
38 Connection clamp
39 Plug connection (dovetail)
40 Connection electrical loads
41 Cable guide channel
42 Aperture rocker
43 Aperture rocker arm
44, 44' Clamping arm
45 Additional aperture rocker arm
46 Cable inlet base
47 Viewing window
48, 48' Spring arms
49, 49' Sliding contacts
50, 50' Sliding surfaces
L Longitudinal direction conductor line
F Direction of travel current collecting device
G Imaginary circle of the sliding contacts about the third rotation axis
P, P' Intersection point sliding surfaces with imaginary circle of the sliding contacts
R Radius segment of a circle of the sliding surfaces
S Symmetry axis of the sliding surfaces

What is claimed is:

1. A current collecting device for an electrical load that can travel in a direction of travel along a conductor line, with at least two sliding contact pieces arranged on a rocker after one another in the direction of travel,
wherein the rocker is mounted on a rocker arm about a rotation axis extending perpendicularly to the travel direction, through the rocker arm the rocker can be moved towards an electrically conductive conductor strand of the conductor line for contacting the sliding contact pieces with the electrically conductive conductor strand of the conductor line, the rocker rotating about the rotation axis causing the sliding contact pieces to move towards and away from the electrically conductive conductor strand so as to contact the electrically conductive conductor strand,
wherein a first spring arm is arranged on the rocker, and the first spring arm slides on a first sliding surface associated with the rocker arm, or the first spring arm is associated with the rocker arm, and the first sliding surface is arranged on the rocker, and
wherein, in case of deflection of the rocker from a resting position around the rotation axis, the first spring arm is tensioned, and the rocker is pushed back towards the resting position, rotating around the rotation axis.

2. The current collecting device of claim 1, wherein the rocker rotates about the rotation axis such that when one sliding contact piece moves towards the electrically conductive conductor strand, the other sliding contact piece moves away from the electrically conductive conductor strand, and vice versa.

3. A current collecting device for an electrical load that can travel in a direction of travel along a conductor line, with at least two sliding contact pieces arranged on a rocker after one another in the direction of travel,
wherein the rocker is mounted on a rocker arm about a rotation axis extending perpendicularly to the travel direction, through the rocker arm the rocker can be moved towards an electrically conductive conductor strand of the conductor line for contacting the sliding contact pieces with the electrically conductive conductor strand of the conductor line,
wherein a first spring arm is arranged on the rocker, and the first spring arm slides on a first sliding surface associated with the rocker arm, or the first spring arm is associated with the rocker arm, and the first sliding surface is arranged on the rocker,
wherein, in case of deflection of the rocker from a resting position, the first spring arm is tensioned, and the rocker is pushed back towards the resting position,
wherein, on the rocker, a second spring arm is arranged, which slides on a second sliding surface associated with the rocker arm, or the second spring arm is associated with the rocker arm, and the second sliding surface is arranged on the rocker, and
wherein, in case of deflection of the rocker from the resting position, the first spring arm is tensioned in a rotation direction about the rotation axis, and the rocker is pushed against the rotation direction towards the resting position, and, in the case of a deflection of the rocker from the resting position, the second spring arm is tensioned in the other rotation direction, and the rocker is pushed against the other rotation direction towards the resting position.

4. The current collecting device of claim 3, wherein the spring arms arranged on the rocker are arranged on sides of the rotation axis and face one another in the direction of travel and are directed towards one another.

5. The current collecting device of claim 3, wherein the spring arms arranged on the rocker arm point away from the rotation axis in opposite directions.

6. The current collecting device of claim 3, wherein the spring arms and/or the sliding surfaces extend symmetrically relative to a symmetry axis extending perpendicularly of the direction of travel and extending through the rotation axis.

7. The current collecting device of claim 3, wherein the spring arms slide with their free ends on the sliding surfaces.

8. The current collecting device of claim 3, wherein the spring arms have thickened sliding contacts at their free ends.

9. The current collecting device of claim 3, wherein the spring arms and/or the sliding surfaces are arranged on a bearing block of the rocker arm.

10. The current collecting device of claim 9, wherein the bearing block is arranged on the rocker arm so that the bearing block can rotate about an additional rotation axis extending perpendicularly of the rotation axis of the rocker and the direction of travel.

11. The current collecting device of claim 9, wherein the bearing block comprises a hollow cylindrical connection piece, which is inserted into a corresponding hollow cylindrical opening of the rocker arm.

12. The current collecting device of claim 3, wherein the rocker arm is arranged on a base so that the rocker arm can rotate about an additional rotation axis extending perpendicularly to the travel direction and parallel to the rotation axis of the rocker, wherein the rocker arm is pushed by a spring away from the base and towards the conductor strand.

13. The current collecting device of claim 12, wherein the base can be clipped to a support plate by snap connections.

14. The current collecting device of claim 3, wherein the spring arms are produced so that the spring arms form a single piece with the rocker or the bearing block.

15. The current collecting device of claim 3, wherein the spring arms are provided on a connection arm of the rocker.

16. The current collecting device of claim 3, wherein at least the first sliding surface is formed so that the first spring arm is more strongly tensioned in case of movement out of the resting position than in the resting position.

17. The current collecting device of claim 16, wherein, in the resting position, the first spring arm is in contact with the sliding surface, and an area of the sliding surface that is adjacent thereto is formed so that the first spring arm is more strongly tensioned in a direction in case of movement out of the resting position than in the resting position.

18. The current collecting device of claim 17, wherein an additional area adjacent to the area of the sliding surface is formed so that the first spring arm is more strongly tensioned in the opposite direction in case of movement out of the resting position than in the resting position.

19. The current collecting device of claim 17, wherein an additional area adjacent to the area of the sliding surface is formed so that the first spring arm is weaker in the opposite direction in case of movement out of the resting position than in the resting position.

20. A conductor line system comprising:
a conductor line;
at least one electrical load that can travel on the conductor line in a longitudinal direction; and
a current collecting device for the at least one electrical load, the current collecting device including at least two sliding contact pieces arranged on a rocker after one another in the direction of travel,
wherein the conductor line comprises at least one electrically conductive conductor strand for sliding contact with the at least two sliding contact pieces of the current collecting device,
wherein the rocker is mounted on a rocker arm about a rotation axis extending perpendicularly to the travel direction, through the rocker arm the rocker can be moved towards the electrically conductive conductor strand for contacting the sliding contact pieces with the electrically conductive conductor strand of the conductor line, the rocker rotating about the rotation axis causing the sliding contact pieces to move towards and away from the electrically conductive conductor strand so as to contact the electrically conductive conductor strand,
wherein a first spring arm is arranged on the rocker, and the first spring arm slides on a first sliding surface associated with the rocker arm, or the first spring arm is associated with the rocker arm, and the first sliding surface is arranged on the rocker, and
wherein, in case of deflection of the rocker from a resting position around the rotation axis, the first spring arm is tensioned, and the rocker is pushed back towards the resting position, rotating around the rotation axis.

21. The conductor line system of claim 20, wherein the electrical load comprises a plurality of the current collecting devices adjacently arranged for contact with correspondingly adjacently arranged conductor strands of the conductor line.

* * * * *